United States Patent [19]

Specht et al.

[11] 4,415,621
[45] Nov. 15, 1983

[54] USE OF α,α-BIS(DIALKYLAMINOBENZYLIDENE) KETONE DYES IN OPTICAL RECORDING ELEMENTS

[75] Inventors: Donald P. Specht; Harold T. Thomas, both of Rochester, N.Y.

[73] Assignee: Eastman Kodak Company, Rochester, N.Y.

[21] Appl. No.: 347,761

[22] Filed: Feb. 11, 1982

Related U.S. Application Data

[63] Continuation-in-part of Ser. No. 124,382, Feb. 25, 1980, abandoned.

[51] Int. Cl.³ .................. B41M 5/24; G01D 15/34
[52] U.S. Cl. .................. 428/172; 346/76 L; 346/135.1; 369/272; 369/288; 427/146; 427/384; 428/195; 428/199; 428/207; 428/209; 428/210; 428/411; 428/913; 430/945
[58] Field of Search .................. 346/76 L, 135.1; 358/128.5, 128.6; 369/272, 283, 286, 288; 427/146, 372, 384, 385, 388; 428/141, 143, 146, 147, 156, 172, 195, 199, 207, 209, 210, 411, 913; 430/200, 348, 945, 964

[56] References Cited

FOREIGN PATENT DOCUMENTS 810458 8/1951 Fed. Rep. of Germany ...... 430/945

OTHER PUBLICATIONS

J. Am. Chem. Soc., 78, 614–622, (1956).
J. Am. Chem. Soc., 79, 1482–1485, (1957).
James, *Photographic Emulsions Recent Development*, Noyes Data Corp., Park Ridge, N.J., 1973, pp. 1 and 63.

*Primary Examiner*—Bruce H. Hess
*Attorney, Agent, or Firm*—John R. Everett

[57] ABSTRACT

Dyes conforming to the structure:

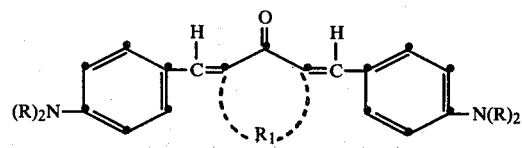

wherein
$R_1$ is $(CH_2)_n$ or

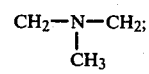

n is an integer from 0–5 and each R is independently selected from the group consisting of straight- and branched-chain alkyl groups of about 1–6 carbon atoms, have a high extinction coefficient at 488 nm and are compatible with common binders such as cellulose-nitrate. These dyes are useful in deformable recording compositions for optical recording elements, e.g., video discs.

10 Claims, No Drawings

USE OF α,α-BIS(DIALKYLAMINOBENZYLIDENE) KETONE DYES IN OPTICAL RECORDING ELEMENTS

This is a continuation-in-part of our earlier filed application Ser. No. 124,382, filed on Feb. 25, 1980, now abandoned.

FIELD OF THE INVENTION

The present invention relates to the use of certain ketone dye compositions in optical recording elements. The ketone dyes have a high extinction coefficient at 488 nm, have good solubility in organic solvents and are compatible with common binders. In one aspect, the present invention relates to optical recording elements which have a layer comprising an amorphous material including a binder and the described dye.

DESCRIPTION RELATIVE TO THE PRIOR ART

Elements for recording information by thermally altering the physical structure of a material are known. One such element comprises a layer of a plastic material solvent coated on a support. The plastic material can be thermally deformed by a writing beam (usually a laser beam) so that some of the plastic material is displaced in the area illuminated by the beam. This deformation pattern retains its shape after the laser beam is "removed". The resulting deformation pattern can be read by projecting the pattern onto a viewing screen.

More recently, elements and means have been provided for rapidly recording large amounts of digital information in a small area. These elements provide a method of recording video information which can be read back with a high signal-to-noise ratio (SNR). These elements employ a thin recording layer of a certain metallic or organic material which is vacuum-deposited on a support. Recording is accomplished by a beam of high-energy density radiation, such as a laser beam. Typically, the laser beam is focused onto the surface of the recording layer of the element. The recording layer is such that it absorbs energy from the laser beam so that small portions of the layer burn, evaporate or are otherwise displaced from these portions. This technique is usually referred to as "ablative recording". Normally, there is continuous motion between the laser and the layer so that, as the laser is pulsed or modulated, discrete pits or holes of varying sizes are created in the layer. The sizes and spacing of these holes constitute the encoded information. One element of this type is commonly referred to in the art as a "video disc".

Video discs of the ablative type can be read back using a laser beam similar to the one used to record the element. In conventional ablative video discs, the reading beam must also be significantly absorbed by the recording layer. A continuous reading beam is focused on the recording layer and the difference in optical density between pitted and unpitted areas is detected by a photodetector. It will be readily apparent that the recording layer must absorb significantly less energy from the reading beam than it absorbs from the writing beam if physical damage to the recording is to be avoided. This is usually accomplished by using a reading beam of much lesser power than the writing beam.

It has recently been discovered that, if the deformations which are formed in the recording layer are of a certain type, the information represented by these deformations can be read using a reading beam which is not absorbed by the recording layer. By using a recording layer of amorphous material having an extremely high absorbency, it has been found that deformations having sharply defined ridges can be formed. It is theorized that the ability to read with a laser which is not absorbed by the recording layer is the result of light scattering or phase shift from the sharply defined ridges. For whatever reason, it is now possible to use a higher-power laser read beam which in turn provides a comparatively high signal-to-noise ratio output. The recording element and method for reading are described in copending, commonly assigned application Ser. No. 23,434 filed Mar. 23, 1979, by Thomas and Wrobel, now abandoned.

In the method of Thomas and Wrobel described in the preceding paragraph, it is desirable to provide a recording layer which has an absorption factor at the recording wavelength which is as high as possible. It was determined that an absorption factor in excess of 20 was necessary to produce the deformations which were readable by a read beam which was not absorbed by the recording layer. The absorption factor is defined as the product of the weight fraction of dye included in the dye-binder composition and the molar extinction coefficient of dye at the wavelength of the recording beam ($\epsilon\lambda$), divided by the molecular weight of the dye (MW). The absorption factor is recited in terms of units of liter per gram-centimeter. Thus, the maximum absorption factor of a particular dye-binder amorphous recording composition is limited by both the extinction coefficient and the compatability of the dye with the binder. One high-energy density radiation source is an argon-laser which emits at about 488 nm. When recording using this laser, it is desirable that the dye which is in the amorphous composition have an extremely high extinction coefficient at this wavelength. Furthermore, it is desirable that the dye be compatible with the binder in high concentrations. While the materials disclosed in the Thomas and Wrobel application cited in the previous paragraph provide for absorption factors high enough to permit the necessary types of deformations to be formed, materials which provide still higher absorption factors have been sought.

SUMMARY OF THE INVENTION

Certain dyes are particularly useful in optical recording elements. These dyes have extremely high extinction coefficients at 488 nm and have excellent solubility in common organic solvents. These dyes are compatible in high concentration with binders which are useful in video disc recording layers and can be used in these layers to provide extremely high absorption factors.

The dyes are (4-dialkylaminobenzylidene) ketones. More specifically, the dyes conform to the structure:

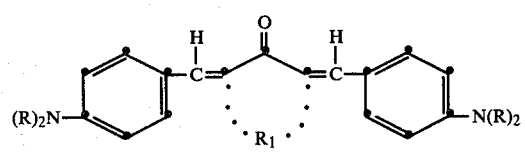

wherein
$R_1$ is $(CH_2)_n$ or

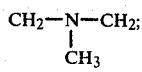

n is an integer from 0-5 and each R is independently selected from the group consisting of straight- and branched-chain alkyl groups of about 1-6 carbon atoms such as methyl, ethyl, isopropyl, t-butyl and the like. (Both the acetone-derived compounds and the cyclopropanone-derived compounds are intended to be included when n=o.)

In one aspect of the present invention, there is provided a recording element comprising a support having coated thereon a layer of amorphous composition comprising a binder and a dye, wherein:

said amorphous material has an absorption factor of at least 20 at 488 nm and said dye is a (4-dialkylaminobenzylidene) ketone as described above.

In another aspect, there is provided a method of making the described recording element.

In another aspect of the present invention, there is provided an information record comprising a support having coated thereon the amorphous dye binder composition described above and having formed therein a plurality of deformations. These deformations have a size smaller than 1.5 microns and comprise a depression surrounded by a sharply defined ridge. These deformations are such that they are detectable using a beam of high-energy density radiation which is not absorbed by the amorphous composition.

DETAILED DESCRIPTION OF THE INVENTION

Useful dyes according to the present invention conform to the structure:

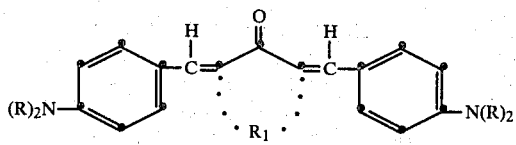

These dyes have extinction coefficients which are very high at 488 nm, typically having a molar extinction coefficient at this wavelength which exceeds about 65,000. In addition, the dyes are compatible at relatively high concentrations with common binders which make them useful in video disc applications. These dyes are soluble in common solvents such as cyclohexanone, acetone, benzene, xylene and the like.

Each R in the structural formula above is alkyl as described. For the purposes of the invention, dyes having substituted alkyl groups such as, for example, halogen-substituted alkyl, e.g., chloromethyl, bromoethyl and the like, are considered to be equivalent. Further, the benzylidene group can be substituted with groups other than the alkylamino group in other positions so long as these substituents do not adversely affect the chromophore. The cyclic ketone ring, when present, can be similarly substituted. Useful substituents include, for example, halogen and lower alkyl. However, dyes not having these substituents are preferred because these substituents add to the molecular weight and therefore decrease the value of $\epsilon\lambda/MW$.

The dyes described above can be made by reacting acetone or a cyclic ketone such as cyclopentanone with a dialkylaminobenzaldehyde. The starting materials for making the dyes useful in the present invention are well-known in the art. The dyes are made by condensing the aldehyde and the ketone in an alkaline solution comprising an organic solvent. The solution can be made alkaline by the addition of suitable base such as potassium hydroxide, sodium hydroxide and the like. Useful organic solvents include methanol and ethanol. The reaction solution can be heated under reflux to produce the desired product.

Illustrative dyes which have been made by this method include:

2,5-bis(4-diethylaminobenzylidene)cyclopentanone
2,6-bis(4-diethylaminobenzylidene)cyclohexanone
1,3-bis(4-diethylaminobenzylidene)acetone
3,5-bis(4-diethylaminobenzylidene)-1-methyl-4-piperidone Other useful dyes include:

2,3-bis(4-dimethylaminobenzylidene)cyclopropanone
2,5-bis[4-(N-t-butyl-N-methylamino)benzylidene]-cyclopentanone The described dyes are compatible with binders which are useful in making laser recording elements. By "compatible" is meant that the dye can be mixed with the binder in sufficient concentration to provide the required absorption factor, e.g., greater than 20, without crystallizing after a layer of the dye and binder is coated and dried. Typically, the described dyes are compatible in dye-binder compositions comprising at least 50 percent dye by weight, although higher concentrations and therefore higher absorption factors are possible. Because of the high extinction coefficient of the present dyes at 488 nm and their excellent compatibility with common binders, these dyes can be included in the composition over a very wide range of concentration while maintaining the absorption factor in excess of 20. This facilitates the optimization of the element.

Useful binders include any film-forming material which is capable of being deformed upon exposure to high-energy density radiation such as a laser beam. Useful binders include cellulose acetate butyrate, polystyrenes, polysulfonamides, polycarbonates, cellulose nitrate, poly(ethyl methacrylate), poly(vinyl butyral) and the like. Combinations of binders can also be used. Cellulose nitrate is the preferred binder.

A useful laser recording element comprises a support having coated thereon a layer of the dye included in the binder. Depending upon the desired mode of reading the element, the support can either be reflective or transparent. In the case of a reflective support, both sides of the support can be reflective and a recording layer can be provided on both sides. The support can be any of a wide variety of materials including glass, a self-supporting polymer film such as poly(ethylene terephthalate) or cellulose acetate, or metal. The support must have a relatively high melting point in order to avoid deformation of the support during recording. The support is desirably very smooth to minimize noise and dropouts. In certain preferred embodiments, the support is coated with a smoothing layer prior to the coating of the reflective surface and the described dye-binder composition.

The composition which is used as a smoothing layer is preferably a low-viscosity, polymerizable fluid which can be coated on the surface of the support. Following coating, polymerization of the fluid produces a microsmooth surface on the support. The support can be made reflective by vacuum metalization of the smooth surface. In preferred embodiments, the polymerizable fluid comprises photopolymerizable monomers. Preferably, the monomers or mixtures of monomers are a low-viscosity fluid in the absence of a solvent. Useful polymerizable fluid compositions are described in U.S. Pat. Nos. 4,092,173 and 4,171,979.

The recording layer comprising the described dye and binder can be coated by many of a wide variety of methods. Most conveniently, the dye and binder are coated from a common solvent or, alternatively, from a mixture of miscible solvents. The dye-binder composition can be coated by spray coating, air knife coating, whirl coating or by any other suitable method. The thickness of the recording layer according to the present invention is not critical; however, best results are obtained when the thickness of the layer is between about 0.1 and about 10 microns.

The described recording compositions are capable of producing depressions or holes surrounded by sharply defined ridges. This type of deformation can be read back using a read beam which is not significantly absorbed by the recording layer. By "sharply defined ridge" is meant that the ridge and hole/depression have noticeable boundaries and that, as measured in the plane of the undeformed outer surface of the layer, the width of the ridge is less than or equal to the breadth of the hole depression. These dimensions can be measured from an electron micrograph.

The thickness, absorption factor and index of refraction of the recording compositions of the present invention can be optimized by a method which is described in copending, commonly assigned application entitled *PHYSICALLY OPTIMIZED OPTICAL DISC STRUCTURE, METHOD AND APPARATUS* by Howe and Wrobel, filed of even data herewith.

The following examples are presented.

Preparation 1:

Preparation of 2,5-bis(4-diethylaminobenzylidene)cyclopentanone

About 110 g of p-diethylaminobenzaldehyde were dissolved in a solution of 80 g of potassium hydroxide in 1000 mL of methanol. About 26 g of cyclopentanone were added with stirring and the reaction mixture was heated under reflux on a steam bath for 3 hr. After chilling in the freezer, a solid precipitate was collected, washed with alcohol and recrystallized from a mixture of alcohol and acetonitrile. The title compound was confirmed by its NMR spectrum. This dye has an $\epsilon_{488}$/MW of 188.

Preparation 2:

Preparation of 3,5-bis(4-diethylaminobenzylidene)-1-methyl-4-piperidone 1-methyl-4-piperidone (2.25 g) and 7.1 g of p-diethylamino-benzaldehyde were added to a solution of 4 g potassium hydroxide in 50 ml methanol. The reaction mixture was heated at reflex 3½ hours and allowed to stand at room temperature overnight. The product was collected and recrystallized from 700 ml acetonitrile. The UV spectra of the isolated product was consistent with the structure of the titled compound.

EXAMPLE 1

Video recording element

This example is similar to Example II of the Howe and Wrobel application cited above.

A 110-mm-diameter circular glass substrate was whirl-coated with a surface-smoothing composition by flooding the glass substrate with the smoothing composition at low rpm (about 80–100 rpm) and then leveling the coating by advancing the speed to about 500 rpm. The surface-smoothing composition comprised:

| | |
|---|---|
| pentaerythritol tetraacrylate | 20 g |
| a low-viscosity urethane-acrylate monomer (UV-curable Topcoat 874-C-2002 ®, Fuller O'Brien Corp) | 20 g |
| 2-ethoxyethanol | 60 g |
| a coumarin sensitizer composition | 3 g |
| surfactant | 3 drops |

The coated and dried surface-smoothing composition was cured by irradiating with a 3000-watt pulsed xenon arc lamp at 18 in for 4 min.

The thus smoothed surface of the substrate was then coated with a 500-Å-thick reflecting layer of aluminum by vapor deposition.

A recording layer was whirl-coated on the reflecting layer by flooding the reflecting layer with the dye-binder composition at low rpm and then leveling the coating at about 1300 rpm. The dye-binder composition was formed by dissolving 1 g of cellulose nitrate and 1 g of the dye prepared in Preparation 1 in 60 g of cyclohexanone. After drying, the disc was ready to use.

Tracks were recorded in the recording layer of the disc using an argon-ion laser-light beam (488 nm) focused with a numerical aperture NAg=0.525 while the disc was rotating at 1800 rpm. (The term "NAg" represents the numerical aperture of the focused gaussian beam of light measured to its $e^{-2}$ irradiance diameter.) The recorded tracks were then read back with a similarly focused helium-neon laser-light beam (633 nm) having a power of about 1 mW on the disc surface. For an incident write power of about 10 mW, the SNR on readout was about 50. In comparison, a recording layer which was the same as that of this example, except that the dye was 3,3'-carbonylbis(7-diethylaminocoumarin), required an incident write power of about 15 mW to produce a recording which could be read back with an SNR of 50.

EXAMPLE 2

A video recording element was prepared as in Example 1 with the dye of preparation 2. The solvent was a mixture of 30 g of chlorobenzene and 30 g of cyclohexanone, instead of 60 g of cyclohexanone. At a recording laser power of between 18 to 20 mW, the SNR was 55 db.

Although the invention has been described in considerable detail with particular reference to certain preferred embodiments thereof, variations and modifications can be effected within the spirit and scope of the invention.

We claim:

1. A recording element comprising a support having coated thereon a layer of an amorphous composition comprising a binder and a dye, wherein:

said amorphous composition has an absorption factor of at least 20 at 488 nm and said dye conforms to the structure:

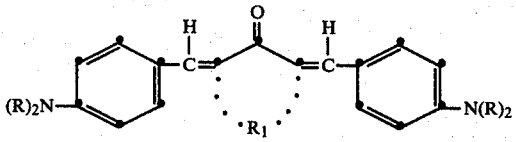

wherein
R₁ is $(CH_2)_n$ or

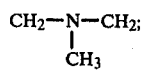

n is an integer from 0–5 and each R is independently selected from the group consisting of straight- and branched-chain alkyl groups of about 1–6 carbon atoms.

2. The recording element according to claim 1 wherein said support is reflecting.

3. The recording element according to claim 2 wherein said dye is selected from the group consisting of:
2,5-bis(4-diethylaminobenzylidene)cyclopentanone,
2,6-bis(4-diethylaminobenzylidene)cyclohexanone,
1,3-bis(4-diethylaminobenzylidene)acetone and
3,5-bis(4-diethylaminobenzylidene)-1-methyl-4-piperidone.

4. The recording element according to claim 1 wherein said binder is cellulose nitrate.

5. An information record comprising a support having coated thereon a layer comprising an amorphous composition comprising a binder and a dye, wherein:
said amorphous composition has an absorption factor of at least 20 at 488 nm and
said dye conforms to the structure:

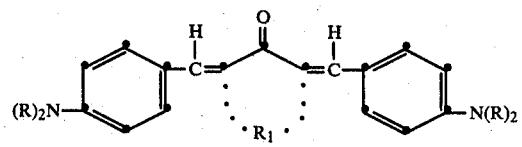

wherein
R₁ is $(CH_2)_n$ or

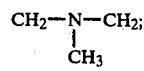

n is an integer from 0–5 and each R is independently selected from the group consisting of straight- and branched-chain alkyl groups of about 1–6 carbon atoms;
said layer having formed therein a plurality of deformations having a size smaller than 1.5 microns, said deformations comprising a depression surrounded by a sharply defined ridge and are detectable using a beam of high-energy density radiation which is not absorbed by the amorphous composition.

6. The information record according to claim 5 wherein said support is reflecting.

7. The information record according to claim 5 wherein said binder is cellulose nitrate.

8. The information record according to claim 7 wherein said dye is selected from the group consisting of:
2,5-bis(4-diethylaminobenzylidene)cyclopentanone,
2,6-bis(4-diethylaminobenzylidene)cyclohexanone,
1,3-bis(4-diethylaminobenzylidene)acetone and
3,5-bis(4-diethylaminobenzylidene)-1-methyl-4-piperidone.

9. A method of making a recording element comprising the steps of coating a support with an amorphous composition comprising a binder and a dye and drying said composition, wherein:
said amorphous composition has an absorption factor of at least 20 at 488 nm and
said dye conforms to the structure:

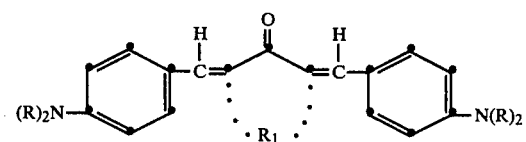

wherein
R₁ is $(CH_2)_n$ or

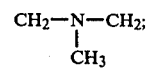

n is an integer from 0–5 and each R is independently selected from the group consisting of straight- and branched-chain alkyl groups of about 1–6 carbon atoms.

10. A method of providing a high absorption factor in a recording element, said method comprising the steps of forming a recording composition by combining a binder and a dye, wherein said dye conforms to the structure:

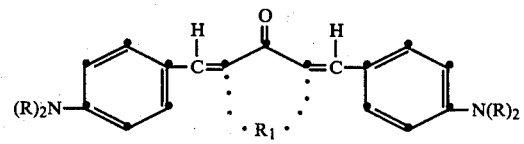

wherein
R₁ is $(CH_2)_n$ or

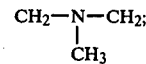

n is an integer from 0–5 and each R is independently selected from the group consisting of straight- and branched-chain alkyl groups of about 1–6 carbon atoms; and coating said composition on a support to form said recording element.

* * * * *